US009516051B1

(12) United States Patent
Hu et al.

(10) Patent No.: US 9,516,051 B1
(45) Date of Patent: *Dec. 6, 2016

(54) DETECTING WEB EXPLOIT KITS BY TREE-BASED STRUCTURAL SIMILARITY SEARCH

(71) Applicant: International Business Machines Corporation, Armonk, NY (US)

(72) Inventors: Xin Hu, White Plains, NY (US); Jiyong Jang, White Plains, NY (US); Fabian Monrose, Chapel Hill, NC (US); Marc Philippe Stoecklin, Bern (CH); Teryl Taylor, Chapel Hill, NC (US); Ting Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,290

(22) Filed: Jun. 25, 2015

Related U.S. Application Data

(63) Continuation of application No. 14/712,210, filed on May 14, 2015.

(51) Int. Cl.
*H04L 29/06* (2006.01)

(52) U.S. Cl.
CPC ....... *H04L 63/1425* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 6,839,749 B1* | 1/2005 | Bera | ................. | G06F 17/509 |
| | | | | 709/223 |
| 7,962,956 B1* | 6/2011 | Liao | ................. | G06F 21/568 |
| | | | | 726/13 |
| 8,291,497 B1* | 10/2012 | Griffin | ................. | G06F 21/564 |
| | | | | 709/224 |
| 8,375,450 B1* | 2/2013 | Oliver | ................. | G06F 21/56 |
| | | | | 713/181 |
| 8,499,283 B2 | 7/2013 | Mony | | |
| 8,832,836 B2 | 9/2014 | Thomas et al. | | |

(Continued)

FOREIGN PATENT DOCUMENTS

WO WO 2014/152469 A1 9/2014

OTHER PUBLICATIONS

Florian Mansmann, et al., "Visual Support for Analyzing Network Traffic and Intrusion Detection Events Using TreeMap and Graph Representations", ACM CHIMIT'09, Nov. 2009, Baltimore, MD, pp. 1-10.

(Continued)

*Primary Examiner* — Dede Zecher
*Assistant Examiner* — Richard McCoy
(74) *Attorney, Agent, or Firm* — Jeff LaBaw, Esq.; McGinn IP Law Group, PLLC

(57) ABSTRACT

A method of detecting exploit kits includes receiving, at an input port of a computer, indication of HTTP (Hypertext Transfer Protocol) traffic. The HTTP traffic is clustered into a web session tree according to a client IP (Internet Protocol. A client tree structure of the web session tree is generated. The client tree structure is compared with tree structures of exploit kit samples.

17 Claims, 12 Drawing Sheets

800

(56) References Cited

U.S. PATENT DOCUMENTS

| | | | | |
|---|---|---|---|---|
| 9,027,135 B1* | 5/2015 | Aziz | ................... | H04L 63/1408 |
| | | | | 726/23 |
| 9,401,922 B1* | 7/2016 | Walters | ................... | H04L 63/14 |
| 9,405,997 B1* | 8/2016 | Elancheralathan | .. | G06K 9/6267 |
| 2008/0010683 A1* | 1/2008 | Baddour | ........... | G06F 17/30864 |
| | | | | 726/24 |
| 2009/0313700 A1* | 12/2009 | Horne | ................... | G06F 21/564 |
| | | | | 726/24 |
| 2010/0095375 A1* | 4/2010 | Krishnamurthy | . | G06F 17/30864 |
| | | | | 726/22 |
| 2012/0084860 A1* | 4/2012 | Cao | .................... | H04L 63/1441 |
| | | | | 726/23 |
| 2012/0130771 A1* | 5/2012 | Kannan | ............ | G06Q 10/06398 |
| | | | | 705/7.32 |
| 2013/0133072 A1 | 5/2013 | Kraitsman et al. | | |
| 2014/0317735 A1 | 10/2014 | Kolbitsch et al. | | |
| 2014/0317754 A1 | 10/2014 | Niemela et al. | | |
| 2015/0101050 A1* | 4/2015 | Nielson | ................ | G06F 21/566 |
| | | | | 726/23 |
| 2015/0304349 A1* | 10/2015 | Bernstein | ............ | H04L 63/1425 |
| | | | | 726/22 |
| 2016/0110421 A1* | 4/2016 | Gall | ................. | G06F 17/30557 |
| | | | | 707/769 |

OTHER PUBLICATIONS

Alexandros Kapravelos, et al., "Revolver: An Automated Approach to the Detection of Evasive We-based Malware", Aug. 2013, USENIX Security, pp. 637-652.
United States Office Action dated Aug. 26, 2016, in U.S. Appl. No. 14/712,210.

* cited by examiner

| SourceIP | DestIP | SourcePort | DestPort | URL | Domain | Referrer | Redirector | Time |
|---|---|---|---|---|---|---|---|---|
| A | D | 6219 | 80 | ad.php | adclick.com | Root.com | ads.com | t2 |
| A | C | 6218 | 80 | / | root.com | N/A | N/A | t1 |
| A | F | 6222 | 80 | banner.jpg | ad2.com | root.com | N/A | t5 |
| A | D | 6221 | 80 | bad.js | malware.com | N/A | N/A | t4 |
| A | E | 6220 | 80 | ad.html | ads.com | N/A | malware.com | t3 |

| Domain | Pointed-to By |
|---|---|
| root.com | N/A |
| adclick.com | root.com |
| ads.com | adclick.com |
| malware.com | ads.com |
| ad2.com | root.com |

300

1: Tf ← set of all Fiesta Trees in Index
2: minval = 1.0
3: for all ( do t ← Tf)
4: for all ( do s ← Search(t, Tf))
5: if TreeSimScore(s, t) > 0.0 then
6: for all ( do n_s ← Node(s); nt ← Node(t))
7: if score ← NodeSimScore(n_s, nt) ≥ 0.1 then
8: nt.totalScore += score
9: nt.numberScores += 1
10: end if
11: end for
12: end if
13: end for
14: for all ( do nt ← Node(t) )
15: avg = nt.totalScore:nt.numberScores
16: if avg ≤ minval then
17: minval ← avg
18: end if
19: end for
20: end for
21: threshold = minval

FIG. 7  700

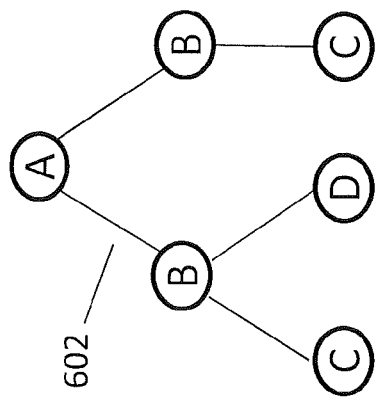

ABC↑D↑↑BC↑ — 601

| Exploit Kits | Instances | Structural Similarity | | | Snort | | |
|---|---|---|---|---|---|---|---|
| | | TPs | FPs | FNs | TPs | FPs | FNs |
| Fiesta | 27 | 25 | 0 | 2 | 19 | 597 | 8 |
| Nuclear | 7 | 5 | 0 | 2 | 5 | 24 | 2 |
| Magnitude | 47 | 47 | 0 | 0 | 46 | 60000+ | 1 |
| FlashPack | 2 | 2 | 3 | 0 | 0 | 9 | 2 |
| Total | 83 | 79 (95%) | 3 | 4 | 70 (84%) | 60630+ | 13 |
| Clickjacking | 130 | 130 | 0 | 0 | | | |
| Fake | 575 | 575 | 0 | 0 | | | |
| Total | 705 | 705 (100%) | 0 | 0 | | | |

DETECTING WEB EXPLOIT KITS BY TREE-BASED STRUCTURAL SIMILARITY SEARCH

This Application is a Continuation Application of U.S. patent application Ser. No. 14/712,210, filed on May 14, 2015.

BACKGROUND

The present invention relates to computer security, and more specifically, to detecting web exploit kit instance infections using a tree-based structural similarity search.

Today, computers are routinely compromised while performing seemingly innocuous activities like reading articles on a trusted website. Compromises are perpetuated through client interactions with the complex advertising networks that monetize these sites, all too often by fraudsters and other miscreants. A well-known example is the widely publicized case involving advertising networks from Google and Microsoft that were tricked into displaying malicious content by miscreants posing as legitimate advertisers.

Many of these HTTP-based attacks are launched through the use of exploit kits, which are web-based services designed to exploit vulnerabilities in web browsers by downloading malicious files with pre-written exploit code in Java, Silverlight, or Flash that then targets users running insecure or outdated software applications on their computers.

For purpose of the following explanation of the present invention, the term "exploit kit", sometimes called an "exploit pack", refers to a type of malicious toolkit used, for example, to exploit security holes found in software applications for the purpose of spreading malware. Common exploit targets have been vulnerabilities in Adobe Reader®, Java Runtime Environment®, and Adobe Flash Player®. An exploit kit can be used even by attackers who are not IT or security experts. The attacker does not even need to know how to create exploits to benefit from infecting systems. Further, an exploit pack typically provides a user-friendly web interface that helps the attacker track the infection campaign. Some exploit kits offer capabilities for remotely controlling the exploited system, allowing the attacker to create an Internet crimeware platform for further malicious activities. A number of exploit kits, such as Fiesta, Blackhole, Goon, Angler, Nuclear, and Magnitude, are well known in computer security circles and represent an entire software-as-a-service sub-industry for cybercriminals.

Currently there are three main techniques for detecting malicious websites related to exploit kits. The most popular approaches are signature- or blacklist-based approaches that look for specific domain names or patterns in URLs or payloads. Unfortunately, blacklists cannot identify domain names that are not in the list, while signature-based techniques are plagued with high false positives and false negatives. The second popular technique involves crawling the web for malicious content using known malicious websites as a seed. The websites crawled are verified using dynamic analysis and flagged sites are added to blacklists. These approaches can be considered as complementary to the new techniques described in the present invention but require significant resources to comb the Internet at scale. Other approaches focus on statistical machine learning techniques to classify web traffic as malicious or benign, but these techniques require a large training set and have high false positive rates.

Another characteristic of exploit kits is that they are typically designed to be agile, to move from server to server in order to avoid detection and blacklisting, so that it can be challenging to detect agile exploit kits using conventional methods.

The present inventors have recognized that conventional techniques for detecting security risks based on exploit kits have a number of problems and that improvements would be beneficial.

SUMMARY

According to an exemplary embodiment of the present invention, the present inventors have recognized that the structural patterns inherent in HTTP traffic can be leveraged to classify specific exploit kit instances using a small training set of known exploit kit instances. An exemplary goal of the present invention is to build a network-centric approach capable of detecting exploit kit instances that are characteristically agile by moving from server to server in order to avoid blacklisting.

A key insight underlying the present invention is that the present inventors have noted that a web-based exploit kit must lead the client browser to download a malicious payload, necessitating multiple requests to malicious servers. The present inventors have also recognized that there is, accordingly, an underlying structure of the web requests that can be encoded in a tree-like form and utilized for classification purposes.

Therefore, unlike existing approaches, the present invention considers traffic structure and utilizes a search strategy rather than a machine learning strategy, enabling the present invention to use a relatively small training set and drastically reducing false positive rates, as compared with other conventional mechanisms used to detect web exploit kits.

BRIEF DESCRIPTION OF THE DRAWINGS

FIG. 6 exemplarily shows how trees can be represented in a canonical string format 600;

FIG. 7 shows exemplary coding 700 used in a prototype embodiment to find a node level similarity threshold;

FIG. 10 shows a summary 1000 of test results of the present invention in comparison with detection by Snort;

DETAILED DESCRIPTION

Figure 1:
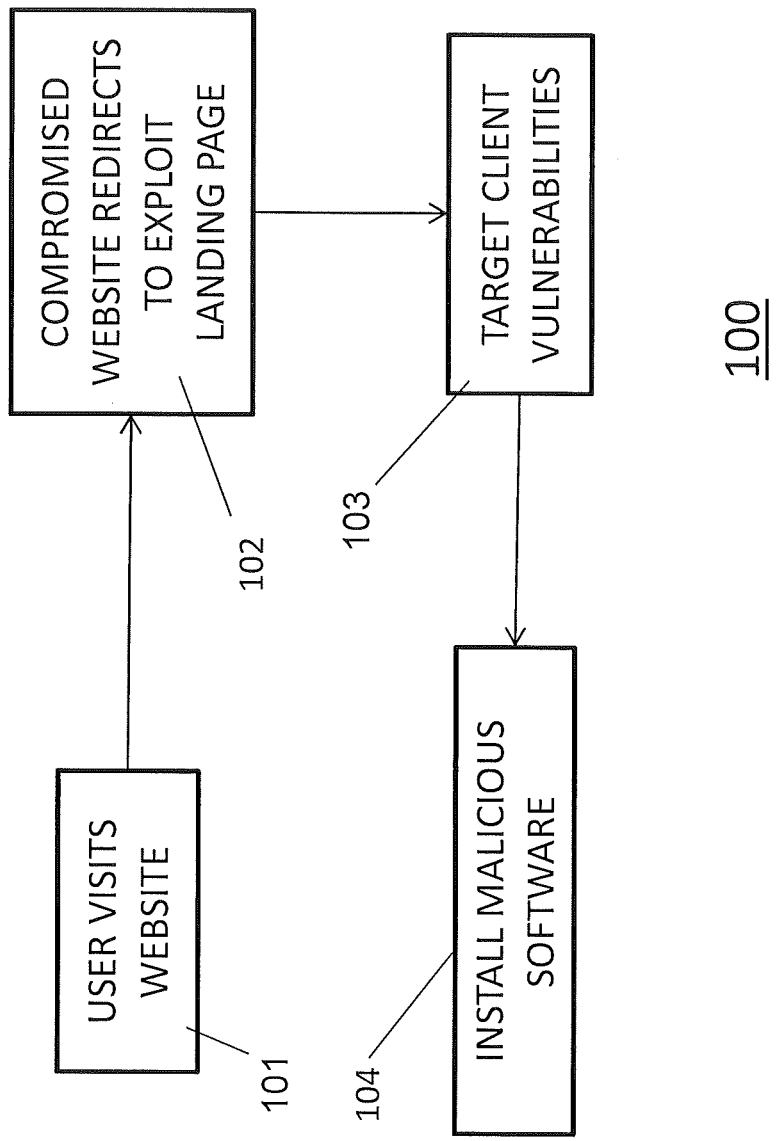
FIG. 1 exemplarily shows the typical four-step process 100 of a user's system when being attacked by an exploit kit.

With reference now to FIG. 1, the exploitation of a user's system typically follows a four-step process wherein, in step 101 a user navigates to a website (e.g., CNN) that, unbeknownst to the user, contains an external link (e.g., an advertising link) with an injected iframe that in turn directs the user's browser to an invisible exploit kit landing page, in step 102. At that point, information about the victim's system is passed along to the attacker's server, in step 103, which is then used to select a malicious exploit file that is automatically downloaded. In step 104, the downloaded file exploits a vulnerability on the system that allows the attacker to install a malicious binary or otherwise control the victim's machine.

It is noted that an "iframe" is well understood in the art as referring to an inline frame, an HTML document embedded inside another HTML document on a website, often used to insert content from another source, such as an advertisement, into a Web page.

Security analysts typically defend enterprise networks from these attacks using network monitoring devices (such as intrusion detection systems or firewalls) that search HTTP traffic as it passes through the network's edge for signature matches or known malicious domain names. Unfortunately, the attack landscape constantly changes as the attackers attempt to hide their nefarious web-based services and avoid blacklisting. As a result, current signature based approaches typically incur high false positive and false negative rates.

In contrast to conventional methods, the present invention uses a network-centric technique for identifying agile web-based attacks. More specifically, the present invention leverages the structural patterns inherent in HTTP traffic to classify specific exploit kit instances. The present invention is based upon the insight that, to infect a client browser, a web-based exploit kit must lead the client browser to visit its landing page, possibly through redirection across multiple compromised/malicious servers, download an exploit file, and download a malicious payload. This process necessitates multiple requests to several malicious servers.

The approach taken by the present invention captures the structure of these web requests in a tree-like form, and uses the encoded information for classification purposes.

To see how this can help, consider the example where a user visits a website, and that action in turn sets off a chain of web requests that loads various web resources, including the main page, images, and advertisements. The overall structure of these web requests forms a tree, where the nodes of the tree represent the web resources, and the edges between two nodes represent the causal relationships between these resources.

For instance, loading an HTML page which contains a set of images might require one request for the page (the root node) and a separate set of requests (the children) for the images. When a resource on a website loads an exploit kit, the web requests associated with that kit form a subtree of the main tree representing the entire page load. Also, the exploitation is a multi-stage process involving multiple correlated sessions. By providing context through structure, the present invention can capture the correlation among sessions, thereby providing improved detection accuracy.

Intuitively, in the mechanism of the present invention, identifying a malicious subtree with a sea of network traffic can accordingly be modeled as a subtree similarity problem. Relative to conventional methods, the present invention's approach based on subtree similarity demonstrates that this new mechanism can quickly identify the presence of similar subtrees given only a handful of examples generated by an exploit kit. Experimental evaluations using the prototype of the present invention on 3,800 hours of real-world traffic show that the approach based on utilizing structure can reduce both the false positive and false negative detection rates over contemporary approaches and has been demonstrated in some scenarios to even be able to detect kits before malicious payloads can be downloaded.

In order to implement the structural approach based on subtree similarity, an index of malicious tree samples is first constructed, using information retrieval techniques. The malware index is essentially a search engine seeded with a small set of known malicious trees. A device monitoring network traffic can then query the index with subtrees built from the observed client traffic. The traffic is flagged as suspicious if a similar subtree can be found in the index.

One reason to use techniques from the field of information retrieval is that these techniques are known to work well with extremely sparse feature sets (e.g., words and phrases), and the feature space for network analysis can be as equally sparse. Moreover, in information retrieval, the desire is to access a set of documents based on a user's query, and in most cases, the resulting set typically comprises a very small portion of the overall set of documents in the data store. Similarly, in network security, the malicious instances in the dataset tend to comprise only a fraction of the overall network traffic.

The present invention also provides a novel solution to the subtree similarity problem, by modeling each node in the subtree as a point in a potentially high dimensional feature space.

Figure 2:
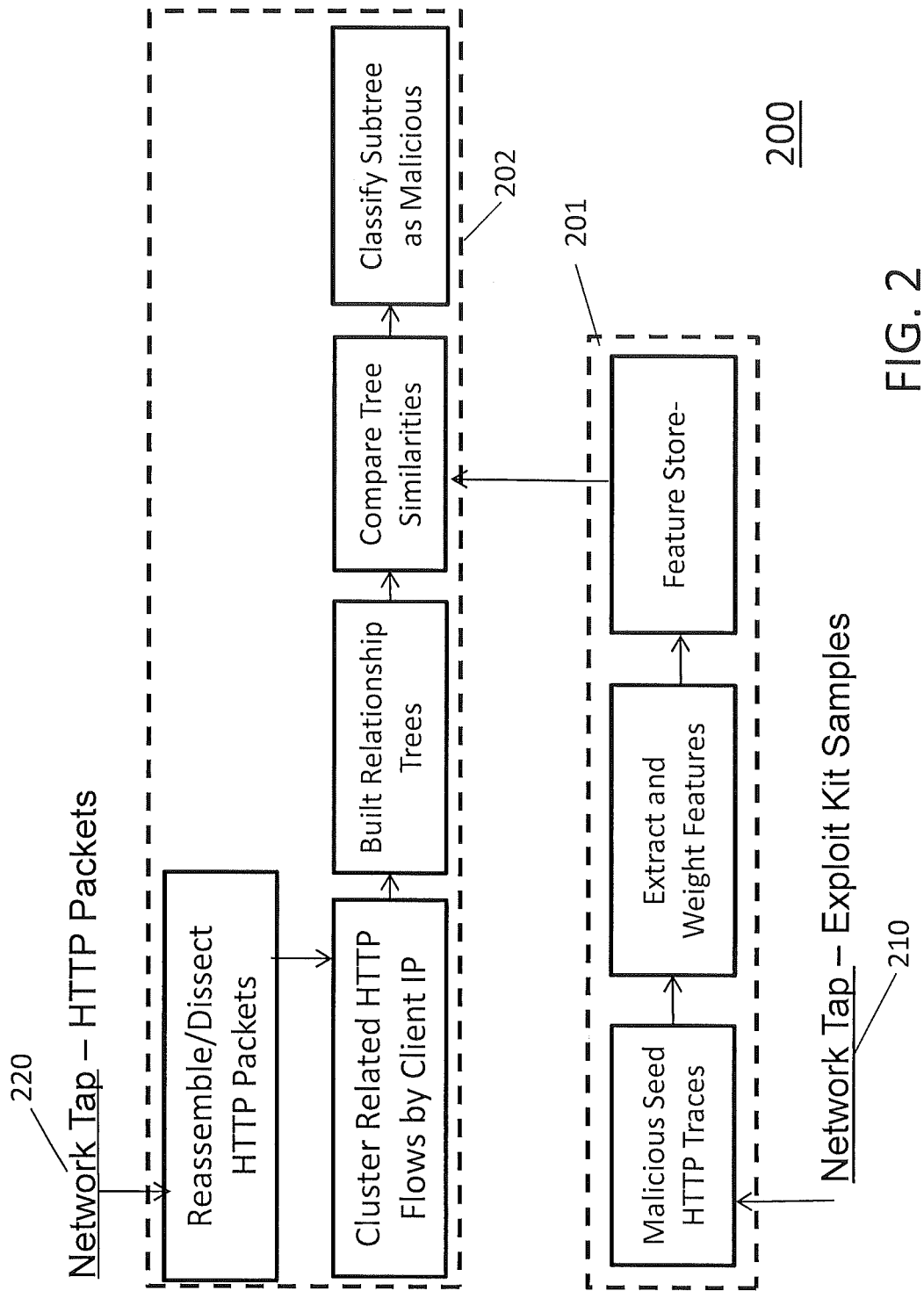
FIG. 2 exemplarily shows a high-level overview 200 of the search-based exploit kit detector using an exemplary embodiment of the present invention.

FIG. 2 shows a high-level overview 200 of an exemplary embodiment of the present invention using this approach. There are two main components 201, 202 in the mechanism of the present invention: an index 201 of known exploit kits; and an online component 202 that monitors HTTP traffic 220 and performs comparisons with the index to identify and label potentially malicious traffic; and.

Indexing Stage

In developing the index 201, HTTP traffic 210 samples are collected that represent client browser interactions with various flavors of current exploit kits (e.g., Fiesta, Nuclear) and converted into tree-like representations. Flow-level and structure information are extracted from these trees, which are then stored in a tree-based invertible index.

Classification Stage

For the online component 202, HTTP traffic is monitored 220 at the edge of an enterprise network, and packets are dissected and reassembled into bidirectional flows. The reassembled flows are grouped by client IP addresses and assembled into tree-like structures referred to herein as "web session trees". A web session tree is then compared to the trees in malware index, using both content and structural-based features. Given a tree and an index of malware trees, the goal is to find all suspicious subtrees in the tree that are highly similar to a tree in the malware index.

On Building Tree Structures from HTTP Traffic

In both the indexing and classification components 201, 202 of the exemplary embodiment, HTTP traffic 210, 220 is grouped and converted into the tree-like web session trees. The session trees for analysis can be built in a two-stage process. The first step in the process is to assemble HTTP packets into bidirectional TCP flows and then group them based on their client IP addresses. Flows are ordered by time and then associated by web session 300, as exemplarily shown in FIG. 3.

Figure 3:
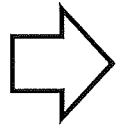
FIG. 3 exemplarily shows how HTTP flows 300 are reordered based on start time and grouped by IP and web session.
Figure 4:
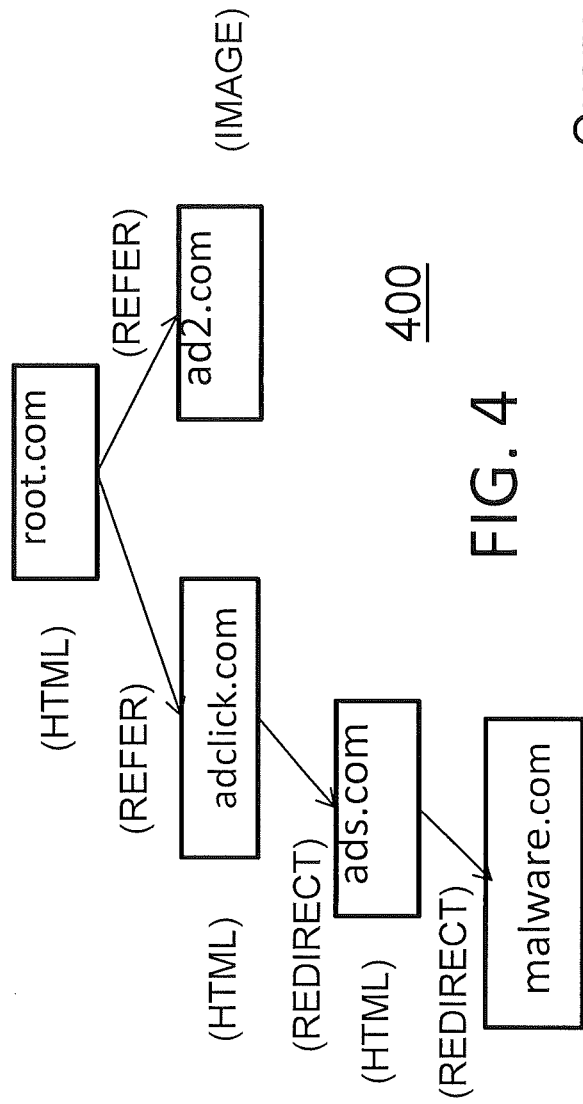
FIG. 4 exemplarily shows how an HTTP tree 400 is built from the reorder flows shown in FIG. 3.

A web session is defined as all HTTP web requests originating from a single root request from a single client over a rolling time window of $\Delta t_w$, set to 5 seconds in an exemplary prototype implementation. For example, a client surfing to Facebook would create a single root request for the Facebook main page, which would in turn make further requests for images, videos, and JavaScript files. All related files form a client "web session" and the relationships between these resources can form a tree-like structure. Trees are built from flows using various attributes including HTTP referrer, and content. The tree 400 built from the exemplary data 300 shown in FIG. 3 is shown in FIG. 4.

In this processing, each HTTP flow is compared with flow groups that have been active in the last window for the associated client IP address. Flows are assigned to a particular group based on specific header and content-based attributes that are checked in a priority order. The highest priority attributes are the HTTP and the Location fields. The field identifies the URL of the webpage that linked the resource requested. Valid fields are used in approximately 80% of all HTTP requests, making them a useful attribute in grouping. The Location field is present during a 302 server redirect to indicate where the client browser should query next. In cases where a valid Referer/Location is not available, the content of existing flows can be scanned for references to the current flow's URL, or domain name. Failing a content analysis, the following attributes are checked against existing flows to see if any match: source port, domain name, and DNS zone (i.e., second level domain name). If the flow does not fit any group, a new group is created.

After a time window expires, a web session tree is built from the associated flows. A node in the tree is an HTTP flow representing some web resource (e.g., webpage, picture, executable, and so on) with all related flow attributes including URL, IP, port, and HTTP header and payload information. An edge between nodes represents the causal relationship between the nodes.

On Building the Malware Index

The malware index is built using HTTP traces from samples of well-known exploit kits (e.g., Fiesta). These samples can be gathered, for example, by crawling malicious websites, using a honeyclient. A honeyclient is a computer with a browser designed to detect changes in the browser or operating system when visiting malicious sites. The first step in building the index is to compile a list of URLs of known malicious exploit kits from websites such as threadglass.com, and urlquery.net. Next, each page must be automatically accessed using the honeyclient and the corresponding HTTP traffic is recorded (e.g., using tcpdump). Each trace is transformed into a tree, and then content-based (node-level) and structural features are extracted and indexed, as described above.

Content (Node-Level) Indexing

An exploit kit tree is comprised of N nodes, where each node represents a bidirectional HTTP request/response flow with packet header, HTTP header, and payload information available for extraction and storage in a document style inverted index. This flow has an associated set of attributes that are extracted and indexed using a document style inverted index. Each bidirectional flow (or node in a tree) can be thought of as a document, and its attributes as the words of the document, which are indexed. Each node is given a unique ID and three types of features are extracted: token features, URL structural features, and content-based features.

Figure 5:
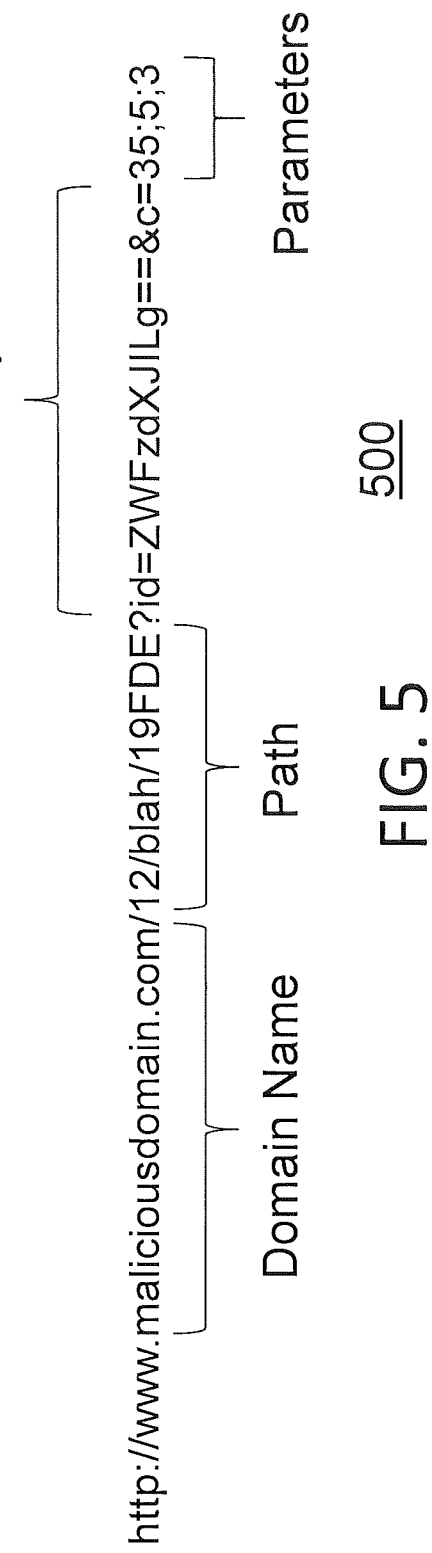
FIG. 5 exemplarily shows components 500 of a URL for feature extraction.

Token features are mainly packet header and URL features. They are gathered from the URL by breaking it down into its constituent parts: domain names, top level domain, path, query strings, query key/value pairs, parameters, destination IP addresses, and destination subnets. All attributes are stored as bags of tokens. For example, the token features for the URL 500 shown in FIG. 5 would be:

www.maliciousdomain.com, com, 12, blah, 19FDE?id=ZWFzdXJILg==&c=35;5; and 3.

URL structural features abstract the components of the URL by categorizing them by their data types rather than their actual data values (as in the token features). The exemplary embodiment used six common data types in URLs: numeric, hexadecimal, base64 encoding, alphanumeric, and words. These datatype encodings are used in conjunction with the lengths or ranges of lengths of corresponding tokens to generate structural URL features. For example, the URL structural features for the URL shown in FIG. 5 12/blah/19FDE would be broken into three features: path-num-2, path-word-4, path-hex-5.

Content-based features are extracted from the HTTP headers or payloads where possible. They include binned content lengths, content types, and redirect response codes.

Structural Indexing

Each malware tree in the index is assigned a unique tree identifier, while each node has a unique node identifier. The tree is stored as a string of node identifiers in a canonical form that encodes the tree's structure. The canonical string is built by visiting each node in the tree in a preorder traversal, and appending the node identifier at the end of the canonical string, as exemplarily shown in FIG. 6.

Thus, FIG. 6 shows the canonical string 600 for the exemplary tree 601. The string 600 is created by visiting each node in a tree using a preorder depth first traversal, and printing the node id. The symbol t in the canonical string 600 represents a backtrack. The canonical string is the lowest lexicographically sorted string for the tree. Each indexed node contains the identifier for its corresponding tree to allow for easy mapping from node to tree while each tree structure is labeled by exploit kit type (e.g., Flashpack, Fiesta, etc.).

On Detecting Malware Through a Subtree Similarity Search

With a malware index at hand, HTTP traffic at the edge of an enterprise network can now be monitored and converted into web session trees. The task is to determine whether any of the web session trees contain a subtree that is similar to a sample in the index, and, if so, the tree is flagged as malicious and labeled by its exploit flavor.

The subtree similarity search problem is approached in an exemplary embodiment using a two-step process: node level similarity search and structural similarity search. First, it is determined whether any nodes in a web session tree T are "similar" to any nodes in the malware index. If there are multiple nodes in T that are similar to a tree E in the index, then the subtree S containing those nodes is extracted. Subtree S is structurally compared with tree E using a tree edit distance technique. Subtrees with sufficient node overlap and structural similarity with E are flagged as malicious.

1) Node Level Similarity Search

To determine whether any nodes in a tree T are sufficiently similar to nodes in the malware index, the set of token, URL structure, and content-based features are extracted from each node x in T. These node features are then used to query the index and return any nodes i that have a feature in common with node x. Node similarity is measured by a score based on the overlapping features between nodes, using any of various possible mechanisms. Two exemplary methods to compare two node similarity approaches could include the Jaccardian Index, and the weighted Jaccardian Index to determine how weighting affects the accuracy of the algorithm.

The Jaccardian Index is a similarity metric that measures the similarity of two sets $X=\{x_1, x_n\}$ and $I=\{i_1, \ldots, i_n\}$ by calculating $$J(X, I) = \left| \frac{X \cap I}{X \cup I} \right|.$$

This calculation generates a score between 0 and 1, with higher scores meaning higher similarity. More precisely, in the context of the present invention, a variant of the Jaccardian Index, called relevance to determine how relevant the set of node features of x in T is to the set of node features of i in the index. To calculate the relevance of X to I, the Jaccardian Index becomes:

$$J(X, I) = \frac{|X \cap I|}{|I|}.$$

Two flows x and i are considered similar if $J(X, I) > \epsilon$, where X and I are feature sets of x and i respectively, and c is a user defined threshold. If a node in tree T is similar to a node in the index, the node in T is assigned the ID from the node in the index. The node IDs are used to compare the structural similarities of the subtrees of T with the matching trees in the index.

A weighted Jaccardian Index introduces weighting to the features of the set. A higher weight value on a feature emphasizes those features that are most distinctive to a malicious flow; thereby, increasing the similarity score of two nodes that are malicious. The weighted intersection of X and I is defined as $I(X,I)=\Sigma_{x \in X \cap I}(x)$, where W is the weight of each feature x.

Then the weighted Jaccardian Index becomes:

$$J(X, I) = \frac{|X \cap I|}{|X \cup I|} = \frac{I(X, I)}{C(X) + C(I) - I(X, I)},$$

where $c(x)=|x|=\Sigma_{x \in X}(x)$. Again, we use a variant of the weighted Jaccardian Index to calculate the relevance of X to I:

$$J(X, I) = \frac{|X \cap I|}{|I|} = \frac{I(X, I)}{C(I)}.$$

We apply a probabilistic term weighting technique to give an ideal weight to term t from query Q. The terms are used in a similarity-based scoring scheme to find a subset of the most relevant documents to query Q. Here, term t is a feature extracted from node x.

To calculate a feature weight W(f), we first consider a dataset of N benign HTTP flows, and R tree instances from a particular malware exploit kit flavor (e.g., Nuclear, Magnitude, Fiesta, and so on). Let some feature f index r of the malicious trees in R and n of the benign flows in N. As such, $$p = \frac{r}{R}$$

is the probability that feature f indexes an exploit kit, while $$q = \frac{(n-r)}{(N-R)}$$

is the probability that f indexes a benign flow.

Therefore, the weight of feature f becomes:

$$W(f) = \log \frac{p(1-q)}{(1-p)q} = \log \left( \frac{r(N-R-n+r)}{(R-r)(n-r)} \right).$$

When r=0, i.e. feature f does not index any of malicious trees, the formulation is not stable; therefore, we apply the following modification as suggested by Robertson and Jones:

$$W(f) = \log \left( \frac{(r+1/2)(N-R-n+r+1/2)}{(R-r+1/2)(n-r+1/2)} \right).$$

The technique of the present invention requires a node-level similarity threshold for each exploit kit family stored in the malware index in order to determine that a node in T is similar to nodes in the index. To compute the necessary thresholds, the node similarities scores of each tree in the malware index are compared, against all the other trees in the malware index that are in the same exploit kit family using a relatively low similarity threshold as a cutoff (e.g., 0.1). An average node similarity score is calculated for each node in each tree in an exploit kit family. The node-level threshold for the kit is calculated by finding the node in the tree with the lowest average similarity score.

This process is presented in the coding 700 shown in FIG. 7. Fiesta tree samples from the malware index are used to exemplarily illustrate the approach. For each tree t in the set of Fiesta trees, all trees s are found that have a tree edit distance similarity score above zero (lines 3-5). For any node in t that has a similarity score above 0.1 with s, its score is recorded (lines 7-9). Finally, the minimum average score is stored as the threshold for the kit. During the feature extraction stage, token and content-based features are ignored in order to provide a conservative lower bound on the threshold.

Figure 8:
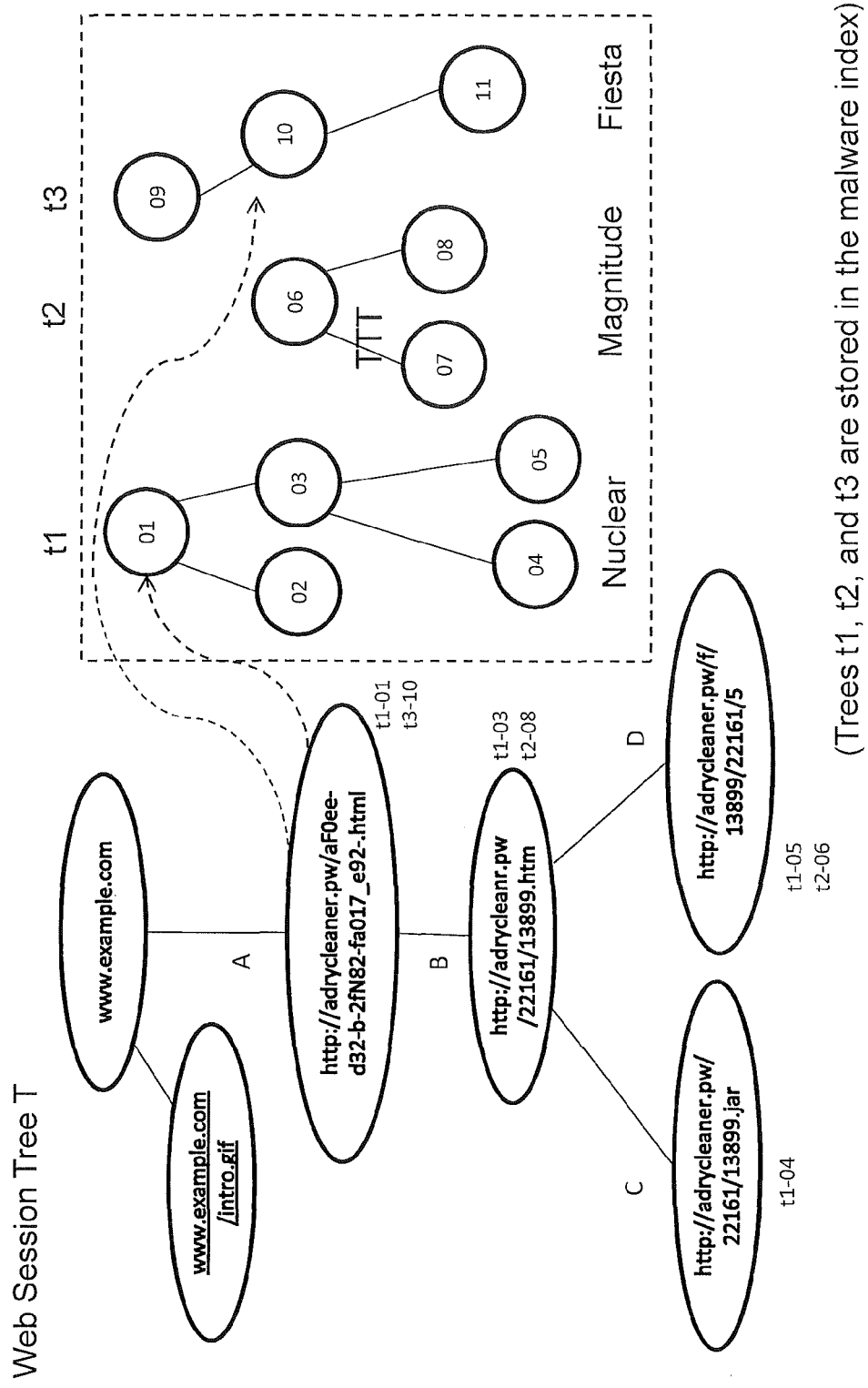
FIG. 8 shows an example of determining tree similarities between a web session tree and trees stored in the malware index.
Figure 9:
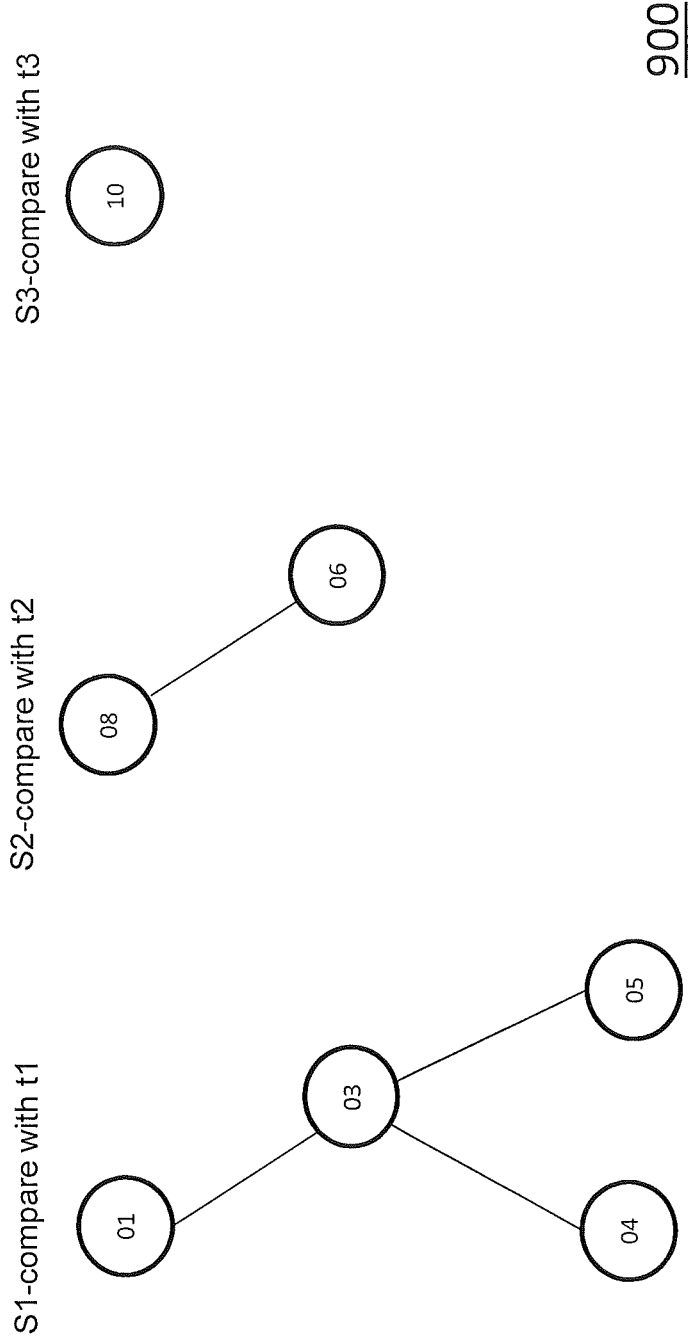
FIG. 9 shows exemplary how, after node mapping between a tree T and trees in the malware index, subtrees S1, S2, and S3 are extracted from T and are structurally compared with trees t1, t2 and t3 from the index using tree edit distance.

2) Structural Similarity Search:

After a node level similarity search between a tree T (collected from the enterprise network during the traffic monitoring stage) and the trees in the malware index, there will be zero or more nodes in T that are considered "similar" to nodes in the malware index. A node in tree T may in fact be similar to multiple nodes in a single tree in the index or even in multiple trees. The next step is to extract the subtrees S within T that map to the corresponding trees in the index. For example, in FIG. 8, node A in tree T maps to node 01 in tree t1 in the index, and to node 10 in tree t3. Similarly, node B in T maps to 03 in tree t1 and node 08 in tree t2 and so on. These node mappings are used to build subtrees of T that can be compared to the corresponding trees in the malware index, as exemplarily shown in FIG. 9.

Subtrees from tree T are compared to the trees in the index using tree edit distance. Tree edit distance uses the number of deletions, insertions, and label renamings to transform one tree into another. Ancestor-descendant relationships are enforced in this setup. For example, if a node was an ancestor of another node in a tree in the index, the relationship must be maintained in the subtree S. Testing and experimentation with a prototype of the present invention, as described briefly below, has shown that this restriction helps to reduce false detections. The result of the tree edit distance calculation is a structural similarity score between 0 and 1 that is then used to classify the subtree as either being benign or similar to a specific exploit kit.

Infrastructure and Evaluation

A prototype of an exemplary embodiment of the present invention was implemented as a multi-threaded application written in approximately 10,000 lines of Python and C++ code. It processes archived bidirectional HTTP flows that are read and converted into web session trees on the fly while node and tree features are stored in the Xapian search engine. Xapian is an open source probabilistic information retrieval library and is a full text search engine library for programmers. The prototype used separate threads to read and parse each flow, to build HTTP web session trees, and to compare the most recently built tree to the malware index.

A multi-core Intel® Xeon® 2.27 GHz CPU with 500 GBs of memory and a 1 TB local disk was used for this prototype implementation. This platform was chosen because it facilitates large-scale experiments by enabling multiple instances of the prototype to be run in parallel. The actual memory allocated for each prototype instance was 20G.

The efficacy of the approach of the present invention was evaluated using logs collected from a commercial HTTP proxy server called BlueCoat, that monitors all web traffic for a large enterprise network. The proxy server records all client-based bidirectional HTTP flows from eight sensors at edge routers around the network. Each flow contained both TCP and HTTP header information, and logs were stored in compressed hourly files.

As described above, the malware index is essentially the "training data" used to detect malicious subtrees in the dataset. As such, for the evaluation the index was populated with exploit kit samples downloaded from a malware analysis website. HTTP traces of exploit kits were then collected, using a honeyclient, and stored in a pcap format. Pcap (packet capture) is an application programming interface (API) for capturing network traffic. Unix-like systems implement pcap in the libcap library, and Windows uses a port of libpcap known as WinPcap.

The exemplary embodiment included a transformation tool for transforming these pcap traces into HTTP trees that were, in turn, indexed. The log data included instance of Nuclear, Fiesta, Fake, FlashPack, and Magnitude exploit kits, along with several instances of a clickjacking scheme, herein referred to as "ClickJack." Clickjacking, sometimes also known as a User Interface redress attack, a UI redress attack, or a UI redressing, hides coding on a malicious website beneath apparently legitimate buttons, which tricks a web user into clicking on something different from what the user perceives they are clicking on, thus potentially revealing confidential information or taking control of their computer while clicking on seemingly innocuous web pages.

A second aspect of building the experimental malware index was the calculation of feature weights for all node features in the index when using the weighted Jaccardian Index for node similarity. This requires malicious samples from the malware index as well as samples of normal traffic in order to determine how prevalent a feature is in both the malicious and benign dataset. In the experiment, ten days worth of benign data from a single sensor in the BlueCoat logs were used to calculate feature weights. The benign data included over 4.4 million bidirectional flows. Finally, the node similarity thresholds were calculated for each exploit using code processing shown exemplarily in FIG. 7.

FIG. 10 shows a summary of the detection results using the present invention compared to evaluations using various rules of Snort. Snort is a free and open source network intrusion prevention system (NIPS) and network intrusion detection system (NIDS) which, in 2009, entered into Info-World's Open Source Hall of Fame as one of the "greatest [pieces of] open source software of all time." Snort can be configured in there main modes: sniffer mode, which reads network packets and displays them on a screen; packet logger mode, which logs packets to a disk/and intrusion detection mode, which monitors network traffic and analyzes it against a rule set defined by a user and then performs a specific action based on what has been identified by the user.

As the data in FIG. 10 shows, for exploit kits for which Snort rules are available (i.e., Fiesta, Nuclear, Magnitude, and FlashPack), the structure similarity-based approach of the present invention achieved a 95% detection accuracy while outperforming Snort at 84%. Considering that false positives place undue burden on analysts to perform a deeper investigation on each reported incident, reducing false positives by over three orders of magnitude is a non-trivial improvement. In addition, the approach of the present invention identified all instances of two exploit kits for which Snort rules were not available (i.e., Clickjacking and Fake).

To further demonstrate the utility of the approach in a large enterprise environment, the prototype was used to analyze three consecutive weeks of BlueCoat logs from Jan. 6-31, 2014, using the weighted version of the approach. During the time period, over 4 billion bidirectional flows and 572 million HTTP trees were generated and analyzed using a malware index consisting of the Fiesta, Nuclear, Fake, ClickJack, and Magnitude exploit kits.

During this deployment the prototype was able to identify 28 exploit kit instances with no false positives, compared with Snort signatures that generated over 22K false positives and missed most of the Fiesta instances. Two of the Fiesta instances downloaded malicious Java files, while two others downloaded spyware. The Nuclear instance successfully downloaded a malicious PDF file followed by a malicious binary. Two Clickjacking instances downloaded Popup Trojans.

The fact that the prototype was able to successfully detect these abuses on a large enterprise network underscores the operational utility of this technique. Indeed, one of the main motivating factors for pursuing this line of research related to the present invention and subsequently building the prototype was the fact that the high false positives induced by existing approaches made them impractical to network operators at the inventors' enterprise—who inevitably disabled the corresponding signatures or ignored the flood of false alerts altogether.

Moreover, from an operational perspective, speed can be as equally important as accuracy in order to keep up with the live traffic in a large enterprise network. Therefore, to assess the runtime performance of the present invention, the processing speed was evaluated for the various components when processing one days worth of traffic across all eight sensors. The experiment showed that a single instance of the exemplary prototype was able to process the entire days of traffic in eight hours. The performance breakdown of different components of the prototype indicated that, on average, the prototype can parse 3.5K flows per second (302M flows per day), build trees at a rate of approximately 350 per second, and conduct the similarity search at a rate of 170 trees per second. Profiling the similarity search module showed that over half the runtime was spent on performing feature extraction and memory allocation, while only 5% of the time was spent on searching the index.

Although the prototype was able to keep up with the average volume of traffic in the target enterprise, the same was not true at peak load. Statistics collected from one day of traffic across all eight sensors showed that at its peak, the network generated 6,250 flows and 550 trees per second. While the current prototype falls short of processing at that speed, by design, all the components (e.g., flow parsing, tree building and feature extraction) are parallelizable, so that, with modest hardware provisions, the prototype should efficiently handle the peak loads.

From an operational perspective, the fact that the exemplary prototype embodiment involved some manual effort on the part of the analyst (e.g., to find and install representative examples of exploits kits into the malware index) might appear as a limitation. Indeed, like most tasks in network security, performing this particular step requires some expertise and domain knowledge. That said, the burden on the operator could be lessened with automated techniques for building these indices, for example, from data made available through websites like threatglass.com. It should be clear that any automated mechanism that can find current instances of exploit kits using, for example, an internet crawler, could eliminate any need for operator manual effort.

The network-centric approach of the present invention uses structural similarity to accurately and scalably detect web-based exploit kits in enterprise network environments. By exploiting both the content and the structural interactions among HTTP flows, this approach not only permits reasoning about the likelihood of a sequence of HTTP flows as being malicious but also pinpoints the exact subset of flows relevant to malvertising. By modeling HTTP traffic as trees, the mechanism can also determine from which root sites or advertising networks an exploit kit was launched. The prototype implementation was evaluated on real world data collected from a large-scale enterprise network and worked remarkably well. In particular, the empirical results show significant improvement over the state-of-the-art methods in terms of false positive and false negative rates across a variety of exploit kits. Lastly, a preliminary analysis in an operational deployment demonstrates that these techniques can easily scale to handle massive HTTP traffic volumes with only modest hardware requirements.

Figure 11:
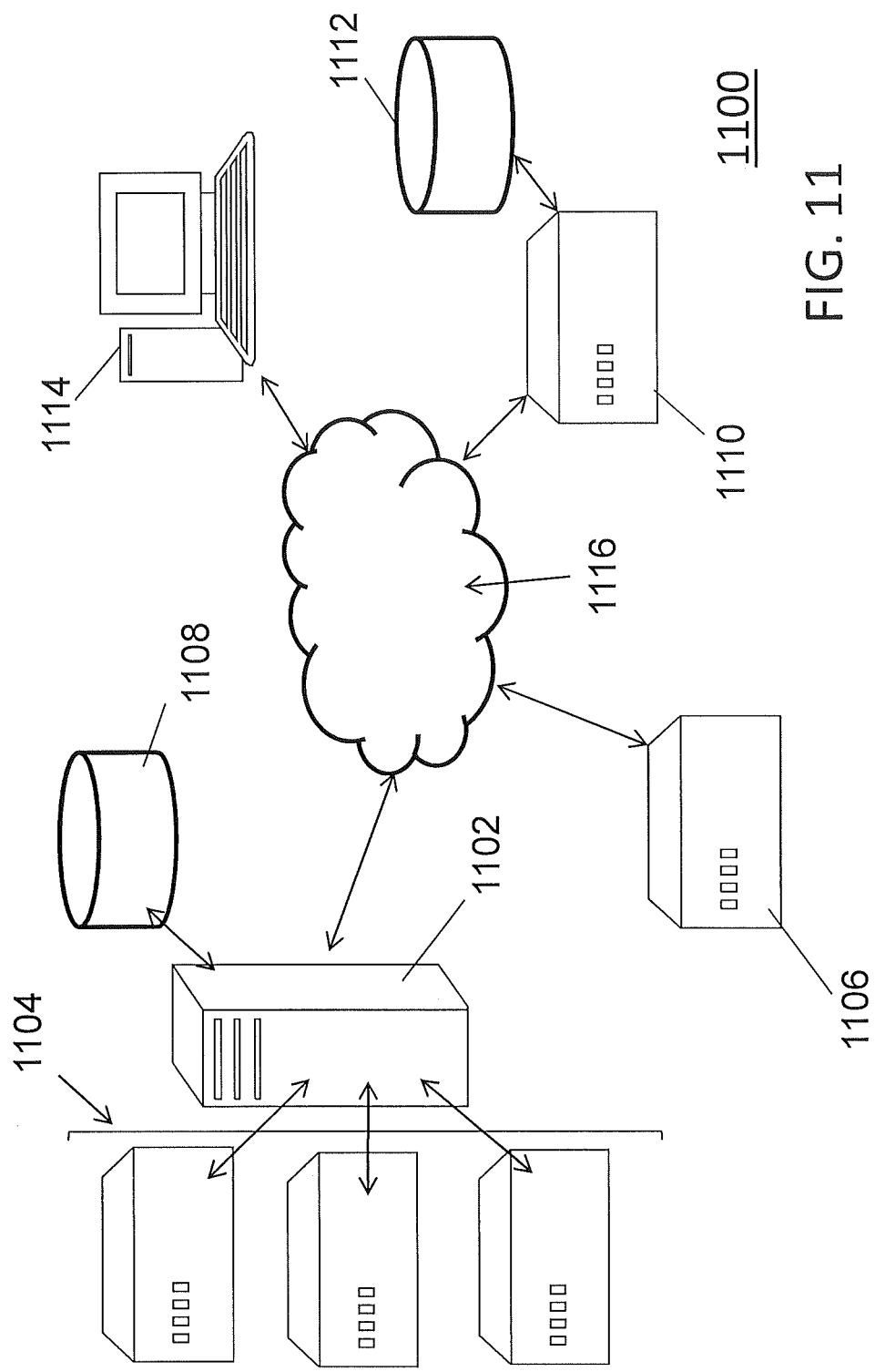
FIG. 11 illustrates exemplary variations 1100 for implementing the present invention in a network, including one providing an exploit kit monitoring as a cloud service.

FIGS. 1-9 explained exemplary methods underlying the exemplary embodiment of the present invention, and FIG. 10 provided an exemplary summary of evaluation results of this embodiment. FIG. 11 shows details 1100 of exemplary implementations of the invention in a network, as an implemented exploit kit detection tool.

As initially developed, the prototype embodiment of the present invention was intended to be an application-type program selectively executable on a server 1102 or gateway that serves as a portal to a protected site or network 1104. Since the invention serves a monitoring purpose, it would be preferable to at least periodically execute the process described in FIGS. 1-9, either under control of a user or administrator or as automatically executed once during a predefined interval such as daily or weekly, etc. Such automatic execution could be implemented, for example, by configuring the application program to execute using a signal from the operating system of the computer 1102. Other mechanisms for automatic periodic execution could include receipt of an initiation signal from a remote location 1106.

Computer 1102 is also shown as associated with a database 1108 for storing data from the periodic executions. Such data would permit the system to evaluate longer periods of time, using stored data of exploit kit instances from previous cycles as well as the data from the current execution period. However, because of the agile aspect of exploit kits, wherein they are constantly moving to different servers, the date in database 1108 could be periodically purged of older data in order to reduce the comparison processing of current activity to include only more recent exploit kit samples.

In a variation, the tooling of the present invention could be installed on a single computer 1110 and providing monitoring for that computer alone, with computer 1110 possibly having a memory device 1112 for storage of monitoring history.

FIG. 11 also demonstrates another variation of the present invention in which the evaluation program described herein is offered as a service to other sites desiring to implement their exploit kit monitoring and detecting by the method of the present invention. In this variation, which could even be implemented as a cloud service, the exploit kit detection tool of the present invention is configured to communicate with another computer 1114 for which monitoring is desired, as possibly located at the periphery of a network or enterprise, similar to server 1102. Computer 1114 would provide data for evaluation to the computer on the network executing the exploit kit monitoring, such as computer 1102 or 1110. The results of the evaluation could be returned to the remote computer 1114 for action by a user/administrator at that remote location, or, possibly, the program execution computer 1102, 1110 could communicate with the remote computer 1114 for automatic location/disposition of potential threats, such as automatic termination of web sessions detected as infected.

In yet another alternative, computer 1106 could be configured to download the exploit kit detection tool to remote computer 1114 via a network 1116, either by request or via an automatic, periodic downloading mechanism, in order to permit remote computer 1114 to itself execute the exploit kit detection tool. Typically, as a servicing tool for client users, the exploit detection tool would be configured for a single execution by the remote computer 1114 and would not remain resident in the remote computer 1114. Other safeguards to preclude the evaluation tool to be transferred to another computer without authorization could also be implemented.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
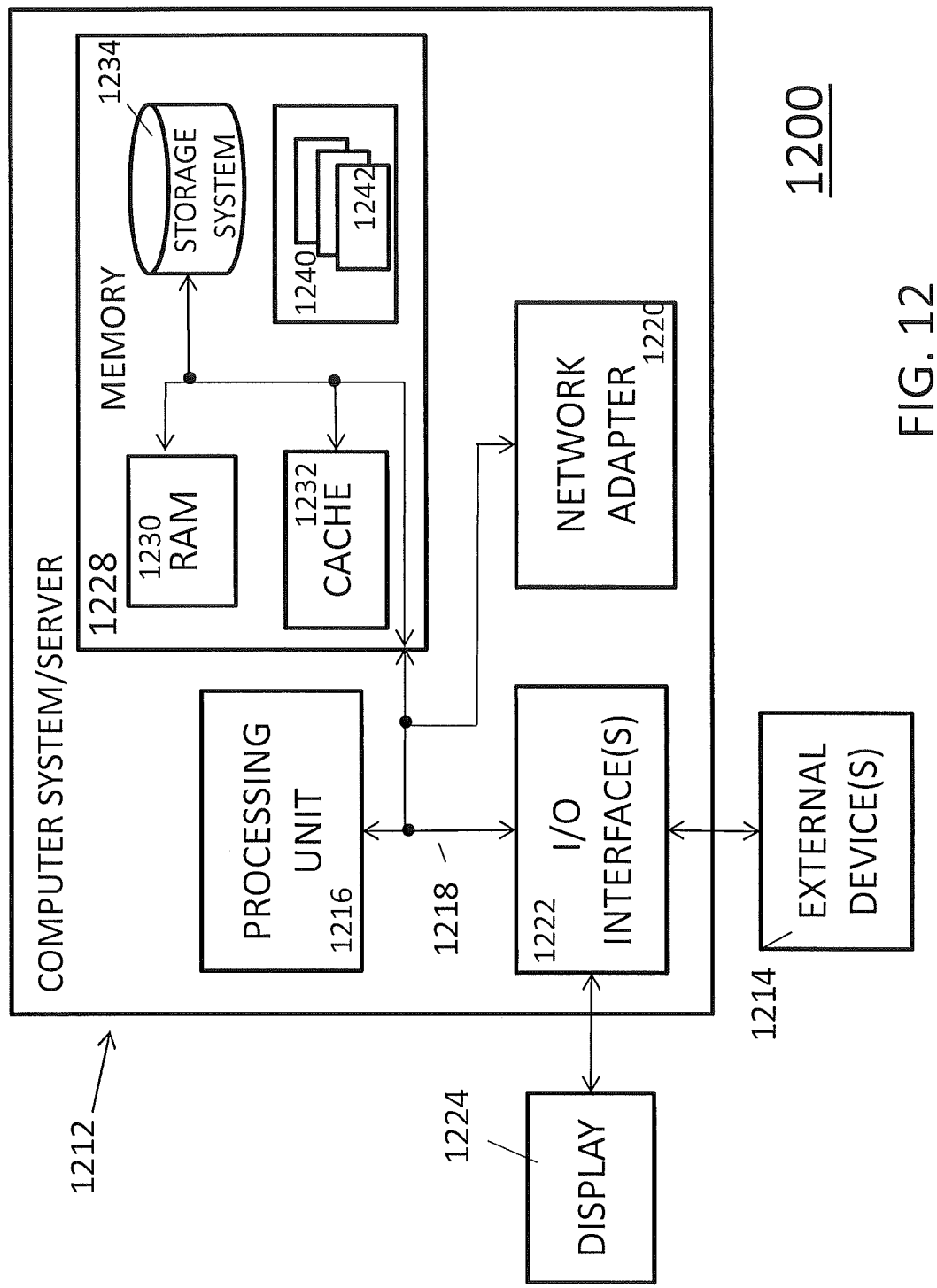
FIG. 12 depicts a cloud computing node 1200 according to an exemplary embodiment of the present invention.

Referring now to FIG. 12, a schematic 1200 of an example of a cloud computing node is shown. Cloud computing node 1200 is only one example of a suitable cloud computing node and is not intended to suggest any limitation as to the scope of use or functionality of embodiments of the invention described herein. Regardless, cloud computing node 1200 is capable of being implemented and/or performing any of the functionality set forth hereinabove.

In cloud computing node 1200 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in cloud computing node 1200 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1212 typically includes a variety of computer system readable media. Such media may be any available media that is accessible by computer system/server 1212, and it includes both volatile and non-volatile media, removable and non-removable media.

System memory 1228 can include computer system readable media in the form of volatile memory, such as random access memory (RAM) 1230 and/or cache memory 1232. Computer system/server 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, memory 1228 may include at least one program product having a set (e.g., at least one) of program modules that are configured to carry out the functions of embodiments of the invention.

Program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc.; one or more devices that enable a user to interact with computer system/server 1212; and/or any devices (e.g., network card, modem, etc.) that enable computer system/server 1212 to communicate with one or more other computing devices. Such communication can occur via Input/Output (I/O) interfaces 1222. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include, but are not limited to: microcode, device drivers, redundant processing units, external disk drive arrays, RAID systems, tape drives, and data archival storage systems, etc.

Figure 13:
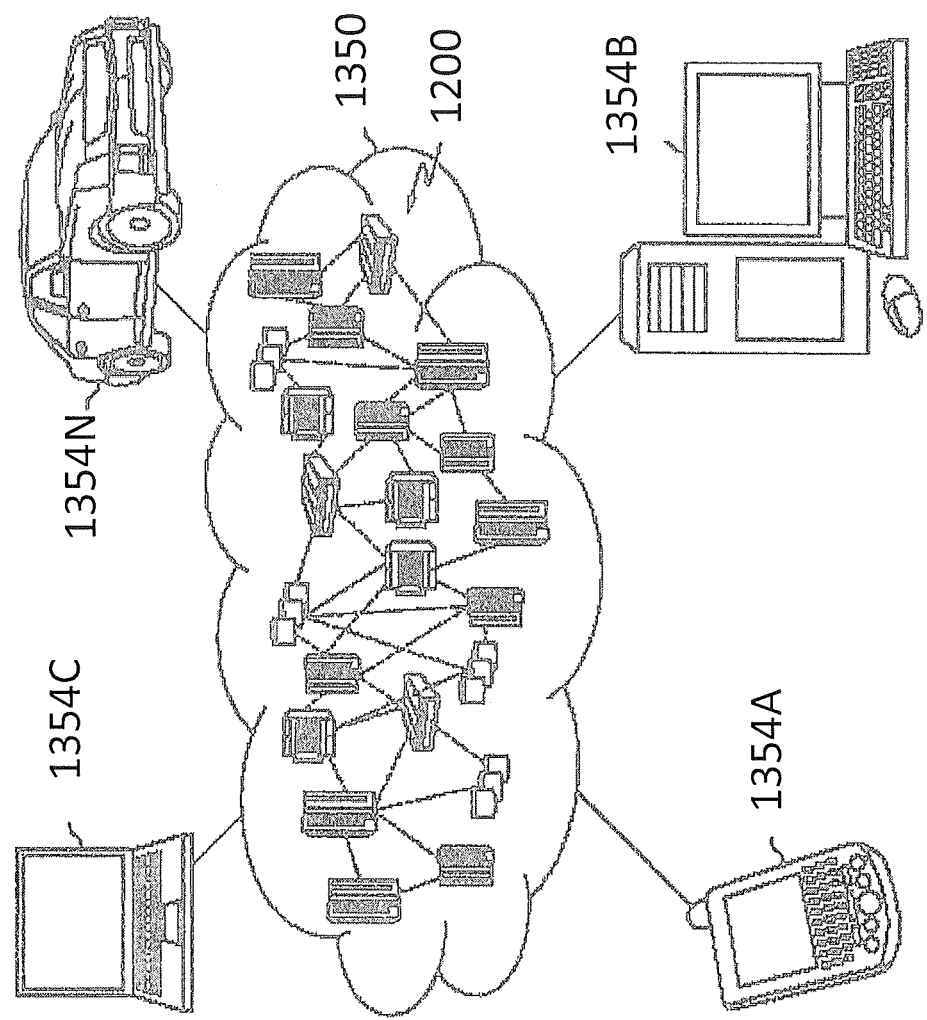
FIG. 13 depicts a cloud computing environment 1300 according to an exemplary embodiment of the present invention.

Referring now to FIG. 13, an illustrative cloud computing environment 1350 is depicted. As shown, cloud computing environment 1350 comprises one or more cloud computing nodes 1200 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1200 and cloud computing environment 1350 can communicate with any type of computerized device over any type of network and/or network addressable connection (e.g., using a web browser).

Figure 14:
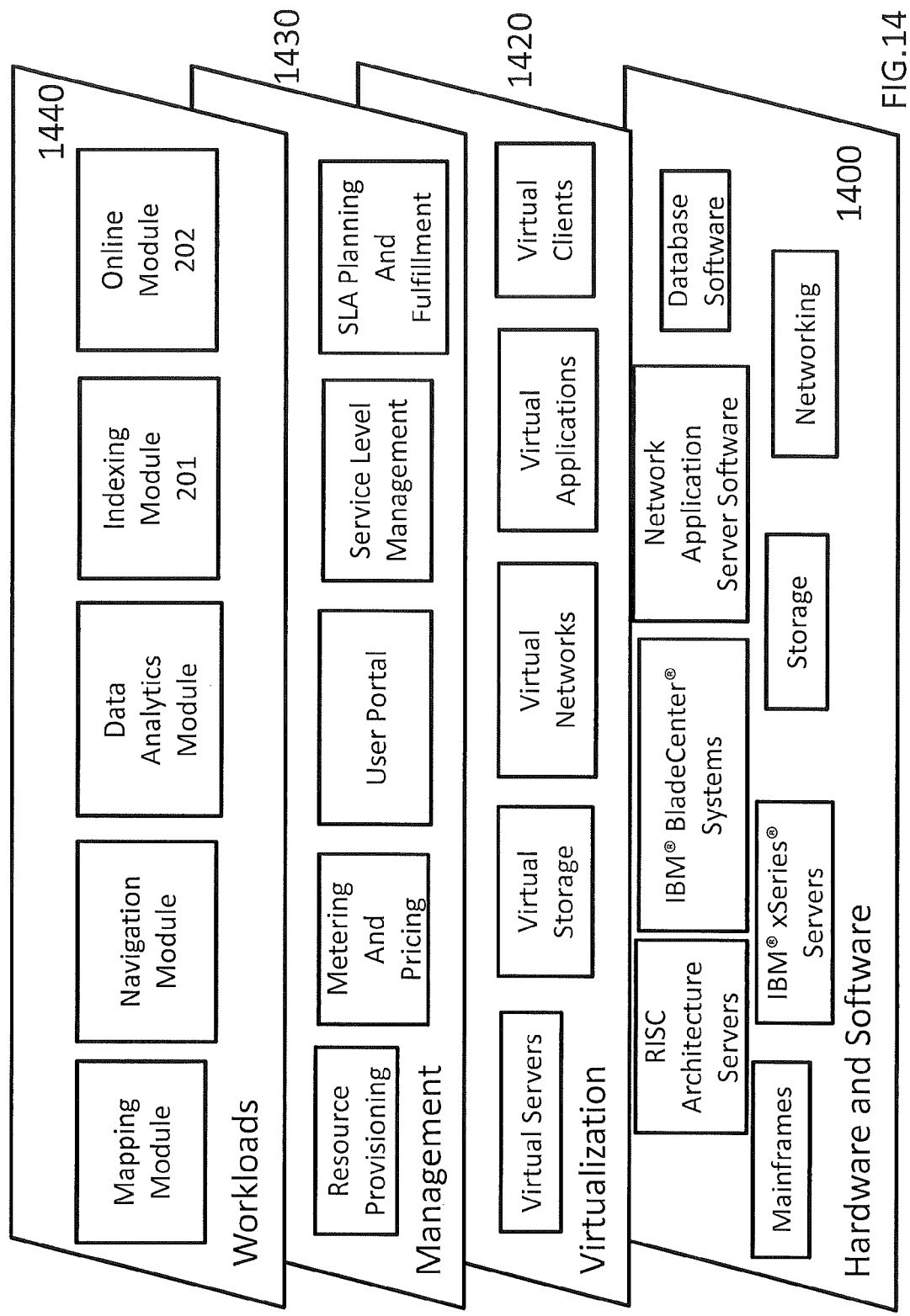
FIG. 14 depicts abstraction model layers 1400-1440 according to an exemplary embodiment of the present invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 1400.

Virtualization layer 1420 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 1420.

In one example, management layer 1430 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 1440 provides examples of functionality for which the cloud computing environment may be utilized Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, the exploit kit indexing and online modules 201, 202 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, at an input port of the computer, indication of HTTP (Hypertext Transfer Protocol) traffic;
   clustering, using the processor on the computer, the HTTP traffic according to a client IP (Internet Protocol) into a web session tree;
   generating a client tree structure of the web session tree;
   and comparing the client tree structure with each tree structure of a plurality of exploit kit samples;
   wherein the plurality of exploit kit samples are stored in an index for the comparing with the client tree structure, the method comprising:
      classifying each of the plurality of exploit kit samples into a type of exploit kit;
      for each type, calculating a plurality of similarity values between each of the exploit kit samples classified in the type;
      and using a lowest similarity value of the plurality of similarity values, as a comparison threshold value for a node level similarity comparison between the client tree structure and the plurality of classified exploit kit samples of the corresponding type.

2. The method according to claim 1, further comprising, if at least one subtree of the client tree structure is determined to be similar to at least one subtree structure of at least one exploit kit sample within a predefined similarity value, classifying at least one subtree of the client tree structure as malicious.

3. The method according to claim 2, wherein a determination of similarity comprises calculating a similarity value between a subtree structure of the client tree structure and subtree structures of the exploit kit samples and the subtree structure of the client is determined as similar to any exploit kit sample if the similarity value is calculated to be higher than a predetermined value.

4. The method according to claim 1, further comprising using a honeyclient to gather one or more exploit kit samples to be used for the comparing with client tree structures, the honeyclient comprising a browser designed to detect changes in the browser or an operating system upon which the browser is operating.

5. The method according to claim 1, wherein tree structures are converted into a canonical format for the comparing, the canonical format comprising a listing of a string of node identifiers that encodes a tree structure that lists each node of a tree structure in a preorder traversal of the tree structure.

6. The method according to claim 1, wherein tree structures are compared initially using a node level similarity search followed by a structural similarity search if the node level similarity search results in a similarity between two tree structures above a predetermined similarity amount.

7. The method according to claim 6, wherein the node level similarity search comprises a comparison of node features of two tree structures using a similarity metric.

8. The method according to claim 7, wherein a threshold for similarity is defined based on comparison values of nodes in different exploit kit samples of a same type of exploit kits.

9. The method according to claim 7, wherein the similarity metric comprises one of a Jaccardin Index and a weighted Jaccardian Index.

10. The method according to claim 6, wherein the structural similarity search is executed using a tree edit distance metric based upon determining a number of deletions, insertions, or label renamings to transform a first tree into a second tree.

11. The method according to claim 1, wherein the clustering of the client IP HTTP traffic occurs in a predefined time window.

12. The method according to claim 1, wherein the client tree structure is further compared with instance samples of one or more clickjacking schemes, each clickjacking scheme comprising coding that hides coding on a malicious website beneath apparently legitimate buttons, thereby tricking a user into clicking onto something different than perceived.

13. The method according to claim 1, as embodied in a set of computer-readable instructions tangibly embodied on a non-transitive storage device.

14. The method according to claim 13, wherein the non-transitive storage device comprises one of:
   a memory device in a computer, as storing programs to be selectively executed by a processor on the computer;
   a memory device on the computer, as storing a program currently being executed by the processor;
   a memory device on a computer selectively connectable to a network, the computer configured to download the set of instructions onto a memory device on another computer in the network; and
   a standalone memory device that can be used to transfer the set of instructions into a memory device on a computer.

15. A method of deploying computer resources, said method comprising provisioning a memory device in a server accessible via a network with a set of computer-readable instructions for a computer to execute a method of detecting exploit kits, where the method of detecting exploit kits comprises:

receiving, at an input port of the computer, indication of HTTP (Hypertext Transfer Protocol) traffic;

clustering, using the processor on the computer, the HTTP traffic according to a client IP (Internet Protocol) into a web session tree;

generating a client tree structure of the web session tree; and comparing the client tree structure with each tree structure of a plurality of exploit kit samples;

wherein the plurality of exploit kit samples are stored in an index for the comparing with the client tree structure, the method comprising:

classifying each of the plurality of exploit kit samples into a type of exploit kit;

for each type, calculating a plurality of similarity values between each of the exploit kit samples classified in the type;

and using a lowest similarity value of the plurality of similarity values, as a comparison threshold value for a node level similarity comparison between the client tree structure and the plurality of classified exploit kit samples of the corresponding type.

16. The method of claim 15, wherein the server one of:

executes the method of detecting beaconing behavior based on network data received from a local area network of computers for which the server serves as a network portal;

receives a request from a computer via the network to execute the method of detecting beaconing behavior, receives data from the requesting computer to be processed by the method, and returns to the requesting computer a result of executing the method on the received data; and receives a request from a computer via the network to execute the method and transmits the set of computer-readable instructions to the requesting computer to itself execute the method of detecting beaconing behavior.

17. The method of claim 15, wherein the server provides a service of executing the method of detecting beaconing behavior as a cloud service.

* * * * *